US006892134B2

(12) United States Patent
Lacey et al.

(10) Patent No.: US 6,892,134 B2
(45) Date of Patent: May 10, 2005

(54) METHOD AND SYSTEM FOR GUIDING A VEHICLE

(75) Inventors: Gerard Lacey, Wicklow (IE); Shane MacNamara, Leixlip (IE)

(73) Assignee: Haptica Limited, Dublin (IE)

( * ) Notice: Subject to any disclaimer, the term of this patent is extended or adjusted under 35 U.S.C. 154(b) by 60 days.

(21) Appl. No.: 10/661,528

(22) Filed: Sep. 15, 2003

(65) Prior Publication Data

US 2004/0064249 A1 Apr. 1, 2004

Related U.S. Application Data

(63) Continuation of application No. PCT/IE02/00031, filed on Mar. 15, 2002.

(30) Foreign Application Priority Data

Mar. 16, 2001 (IE) .......................................... 2001/0267

(51) Int. Cl.[7] ............................. G01C 21/20; G05D 1/02
(52) U.S. Cl. ..................... 701/209; 701/211; 701/213; 342/357.13; 340/995.18
(58) Field of Search ................................. 701/200–213, 701/300, 301; 342/357.01–357.13; 340/995.1–995.18, 996

(56) References Cited

U.S. PATENT DOCUMENTS

| 6,172,641 B1 | | 1/2001 | Millington | 342/357 |
| 6,427,118 B1 | * | 7/2002 | Suzuki | 701/209 |
| 6,581,001 B1 | * | 6/2003 | Katsuka et al. | 701/209 |
| 6,804,604 B2 | * | 10/2004 | Yamazaki | 701/211 |

FOREIGN PATENT DOCUMENTS

| DE | 245736 A1 | 5/1987 |
| DE | 19813005 A1 | 10/1999 |
| FR | 2785383 | 5/2000 |

* cited by examiner

*Primary Examiner*—Richard M. Camby
(74) *Attorney, Agent, or Firm*—Jacobson Holman PLLC

(57) ABSTRACT

Movement of a vehicle such as a boat (30) is guided by dynamically monitoring parameters and generating instructions for the operator. The instructions are at a level to attain a number of sub-goals to reach a goal position (33) from a current position (32). Each sub-goal is attained in a single vehicle manoeuvre such as straight-ahead or rotation, each manoeuvre being instructable to the operator. The instructions are generated using a space model (12) of the space around the vehicle, an operator model (11) of operator vehicle control characteristics, and a vehicle model (12) of vehicle movement characteristics.

19 Claims, 11 Drawing Sheets

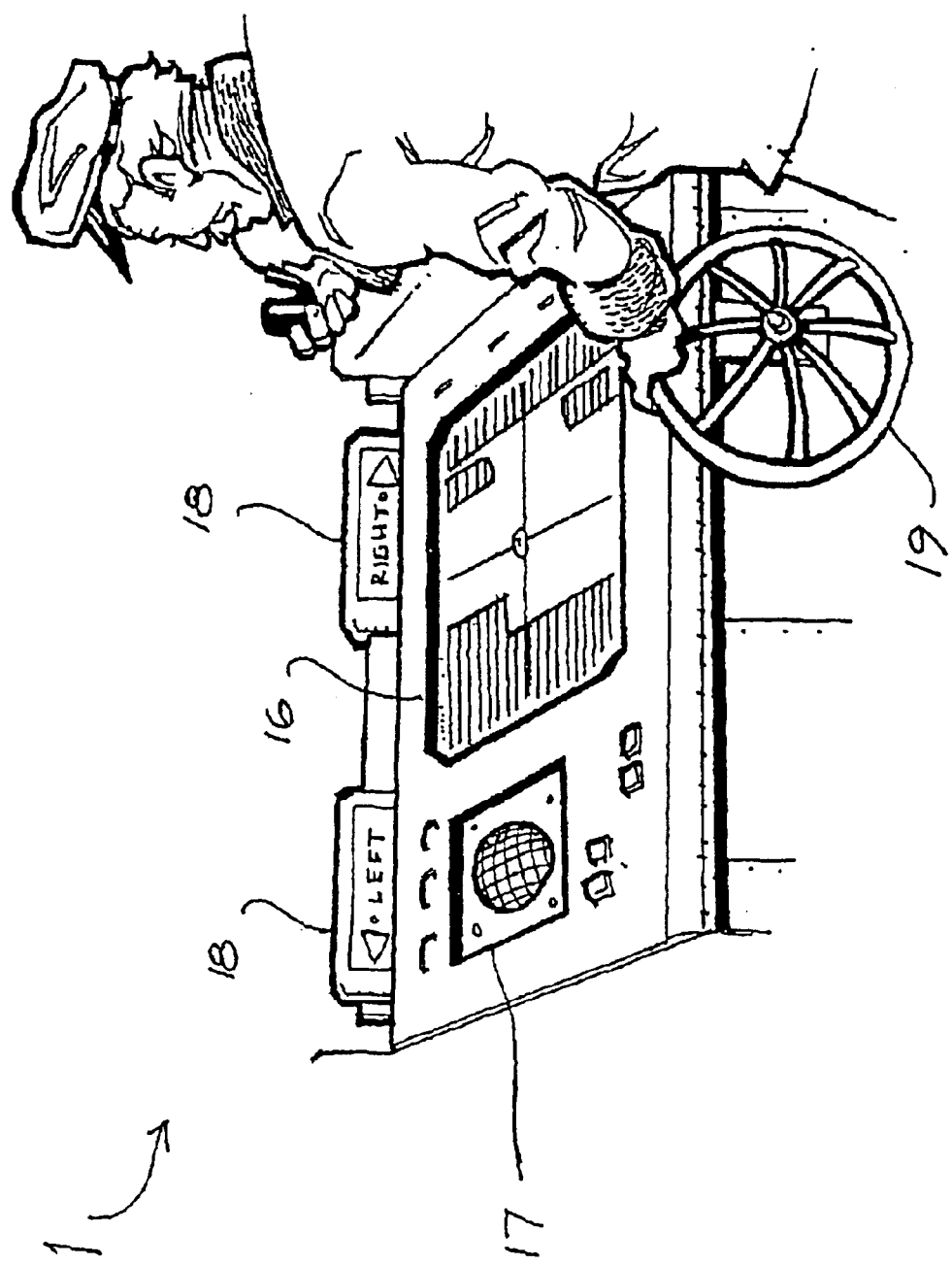

METHOD AND SYSTEM FOR GUIDING A VEHICLE

This is a continuation of PCT/IEO2/00031 filed Mar. 15, 2002 and published in English.

FIELD OF THE ENVENTION

The invention relates generally to control of vehicle movement in confined spaces where a human operator has a limited view of the surroundings. The vehicle may, for example, be an automobile, a boat, a wheelchair for a visually impaired person, a rollator for a visually impaired person, or a submersible.

PRIOR ART DISCUSSION

U.S. Pat. No. 6,172,641 (Magellan) describes an in-vehicle navigation system which generates audible instructions for a driver to guide the driver on a route. The system uses a stored map and a current vehicle location to generate the instructions.

While such a system appears to be effective for some situations, the extent of information provided to the driver is limited.

The invention is therefore directed towards providing more comprehensive operator guidance for manoeuvring vehicles.

SUMMARY OF THE INVENTION

According to the invention, there is provided a vehicle guidance system comprising means for detecting position of a vehicle and a processor for generating operator instructions to assist the operator to manoeuvre the vehicle, characterised in that the system comprises range sensors and means for using outputs of the sensors to dynamically maintain a space map in real time;

the system comprises an operator model of operator capabilities; and the processor comprises means for planning a path to a goal position in a confined space using data from the operator model of operator capabilities and data from the space map.

Use of range sensors allows space around the vehicle to be dynamically monitored for guidance. The fact that the operator characteristics are also used for guidance ensures that the operator is in control irrespective of his or her capabilities. Thus, the invention achieves the benefit of automated sensing for path planning and collision avoidance, while leaving the operator in control.

In one embodiment, the system comprises means for maintaining the space map as a set of polygons each defining a spatial area.

In another embodiment, said space map maintaining means comprises means for processing three-dimensional space data from the sensors and for breaking said data to two-dimensional space data in a polygon framework.

In a further embodiment, said space map maintaining means comprises means for maintaining a flag for each polygon, said flag indicating if the polygon is occupied by an object.

In one embodiment, the operator model comprises time parameter values for the operator to perceive information, for the operator to cognitively process information, and for neuromuscular delay for implementing an action.

In another embodiment, the operator model comprises a parameter value for spatial error for performing an action.

In a further embodiment, the processor comprises means for storing a vehicle model of movement characteristics of the vehicle.

In one embodiment, the processor comprises path planning means for planning a plurality of sub-goals forming a path to the goal position.

In another embodiment, the path planning means comprises means for determining a sub-goal only if it can be achieved with a single manoeuvre of the vehicle and if it is instructable to the operator.

In a further embodiment, the path planning means comprises means for determining a set of candidate trajectories for reaching the goal position with collision avoidance, and for performing backchaining to break each candidate trajectory into a plurality of sub-goals starting from the goal position and extending back to the current position.

In one embodiment, the set of candidate trajectories is determined by generating a first set of candidate trajectories compatible with the space and the vehicle models, and for subsequently reducing the first set to those compatible with the operator model.

In another embodiment, the path planning means comprises means for dynamically repeating path planning in real time at each of a plurality of vehicle positions.

In a further embodiment, the vehicle model is for a boat, and the sensors comprise a sonar device, a laser range finder, a vision system, a radar system, and a GPS circuit.

In another aspect, the invention provides a vehicle comprising a guidance system as defined above.

In a further aspect, the invention provides a method of guiding a vehicle from a current position to a goal position in a confined space, the method comprising the steps of:

range sensors automatically sensing objects around the vehicle, a processor using outputs of the range sensors to dynamically maintain a space map in real time, the processor planning a path to the goal position using data from the space map and from an operator model of operator capabilities, an output interface outputting instructions to the operator for movement of the vehicle according to the planned path, and the operator moving the vehicle according to the instructions.

In one embodiment, the processor generates instructions for the operator for movement of the vehicle in a single manoeuvre at a time.

In another embodiment, the processor performs backchaining to break down a path into a plurality of sub-goals, and generates an operator instruction to achieve each sub-goal in turn.

In a further embodiment, the processor repeats path planning at each position on the basis of the current position.

In one embodiment, the processor generates the operator instructions also using data from a vehicle model of vehicle movement characteristics.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIG. 5 is a perspective view of those parts of the guidance which interact with an operator;

DESCRIPTION OF THE EMBODIMENTS

Figure 1:
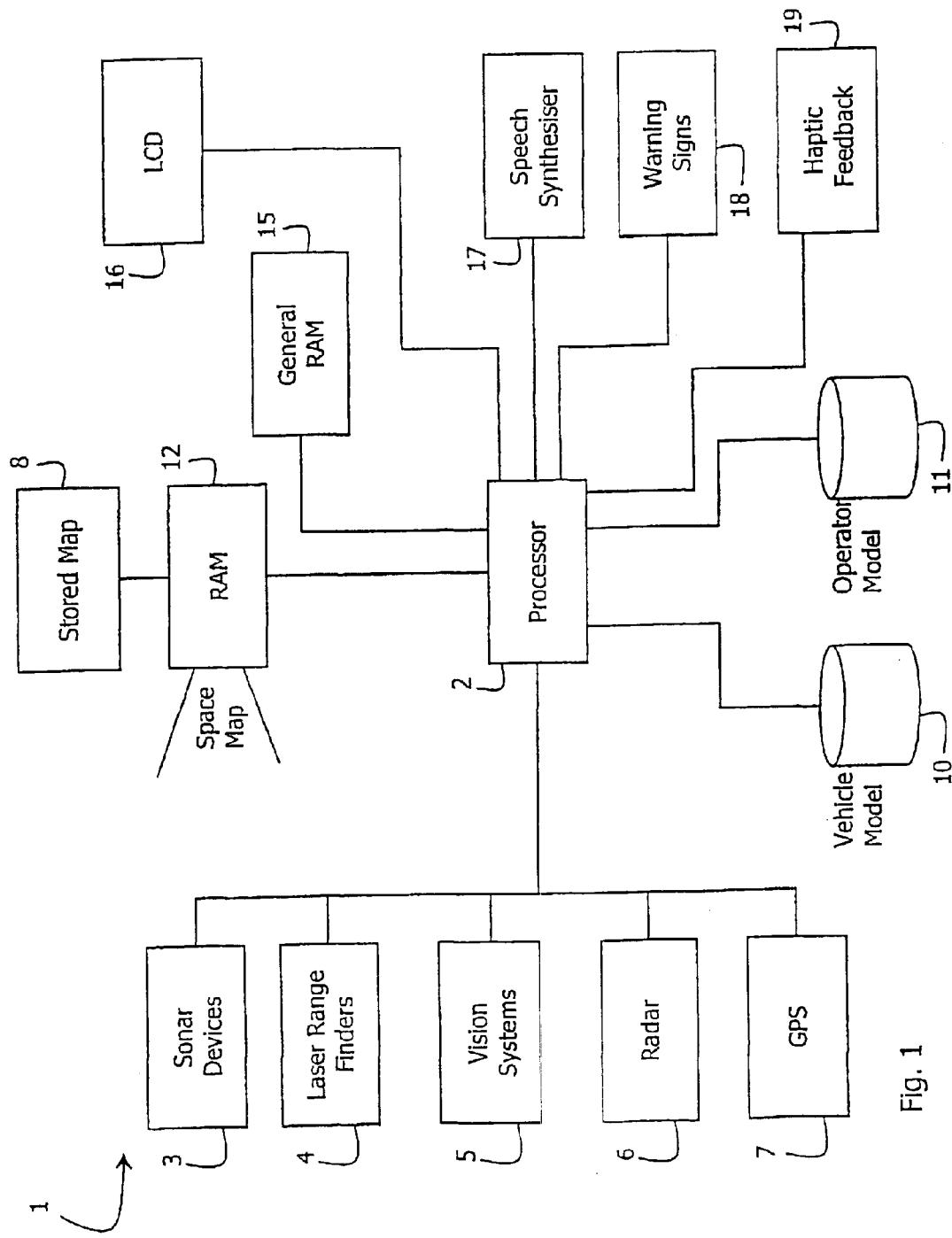
FIG. 1 is a diagram illustrating a guidance system for a boat.

Referring to FIG. 1 a guidance system 1 for a boat is illustrated. The system 1 is particularly for assisting a pilot to manoeuvre a large boat into a dock from a position either inside or outside a harbour. In many instances the available space for docking large boats is very confined.

The system 1 comprises a processor 2 and range sensors for sensing objects in the space surrounding the boat. These sensors are sonar devices 3, laser range finders 4, vision systems 5, radar systems 6 and GPS 7. A stored vehicle model 10 and a stored operator model 11 are accessible to the processor 2. These models are updated regularly, but are not truly dynamic in the sense of being updated in real time during docking. The system 1 also comprises a random access memory (RAM) dynamic space map 12 which is dynamically updated in real time. There is also a general RAM 15, and a stored spatial map 8.

Finally, the system 1 comprises various output devices for guiding an operator, namely a liquid crystal display (LCD) 16, a speech synthesiser 17, warning devices 18 for sounding audible warnings and having flashing beacons, and a haptic feedback mechanism 19 in the helm. Some of these devices are also shown more illustratively in FIG. 5.

Figure 2:
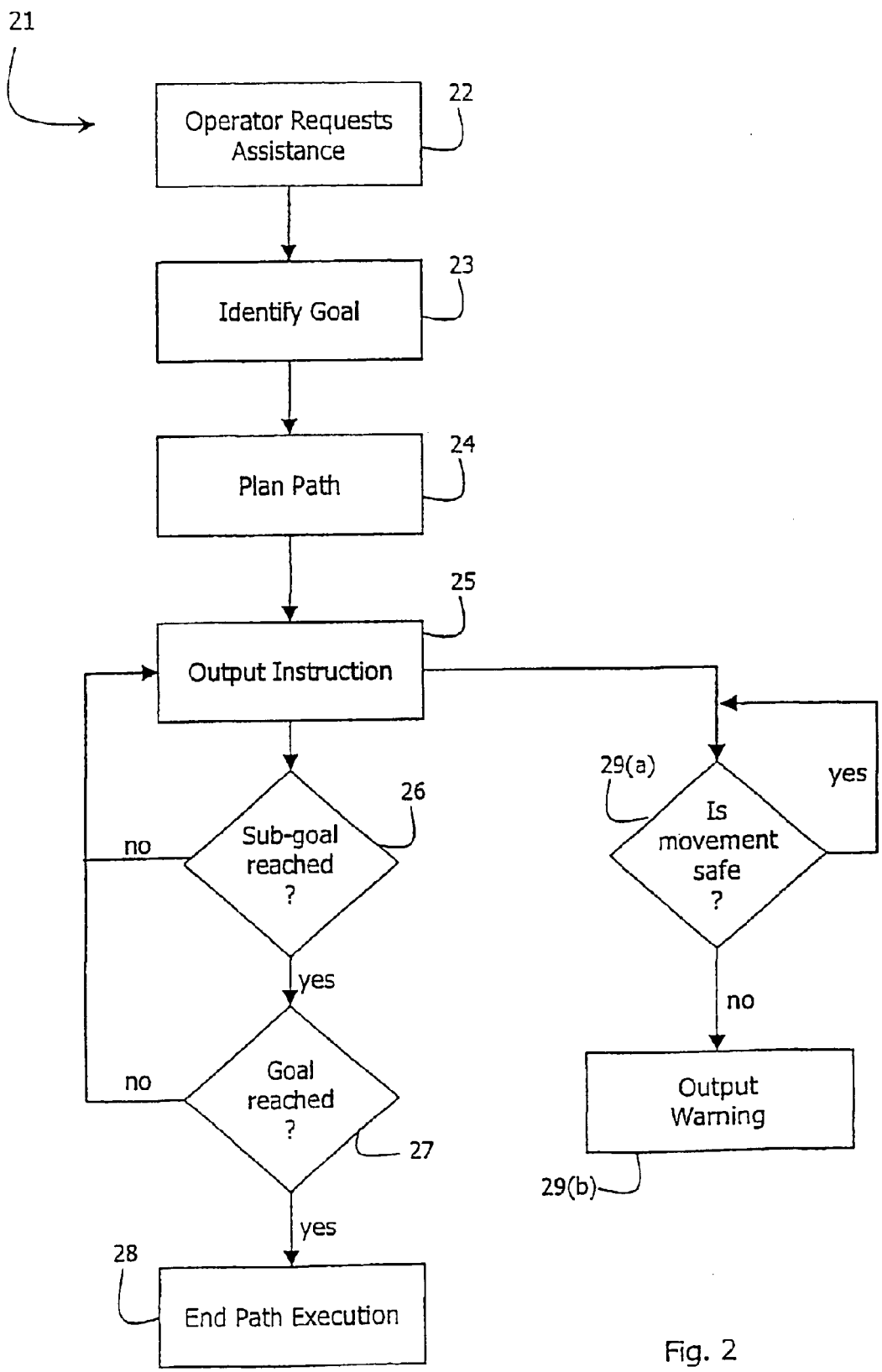
FIG. 2 is a flow diagram illustrating overall operation of the guidance system.

Referring to FIG. 2 operation of the system 1 in a method 21 to reach a goal of docking the boat is illustrated. In step 22 the operator may request assistance by inputting data indicating location of the dock according to coordinates of the space map 12. If a goal has not been provided by step 22 a goal may be inferred by step 23. This goal is determined by analysing the space and previous manoeuvres to infer the likely goal.

Figure 4:
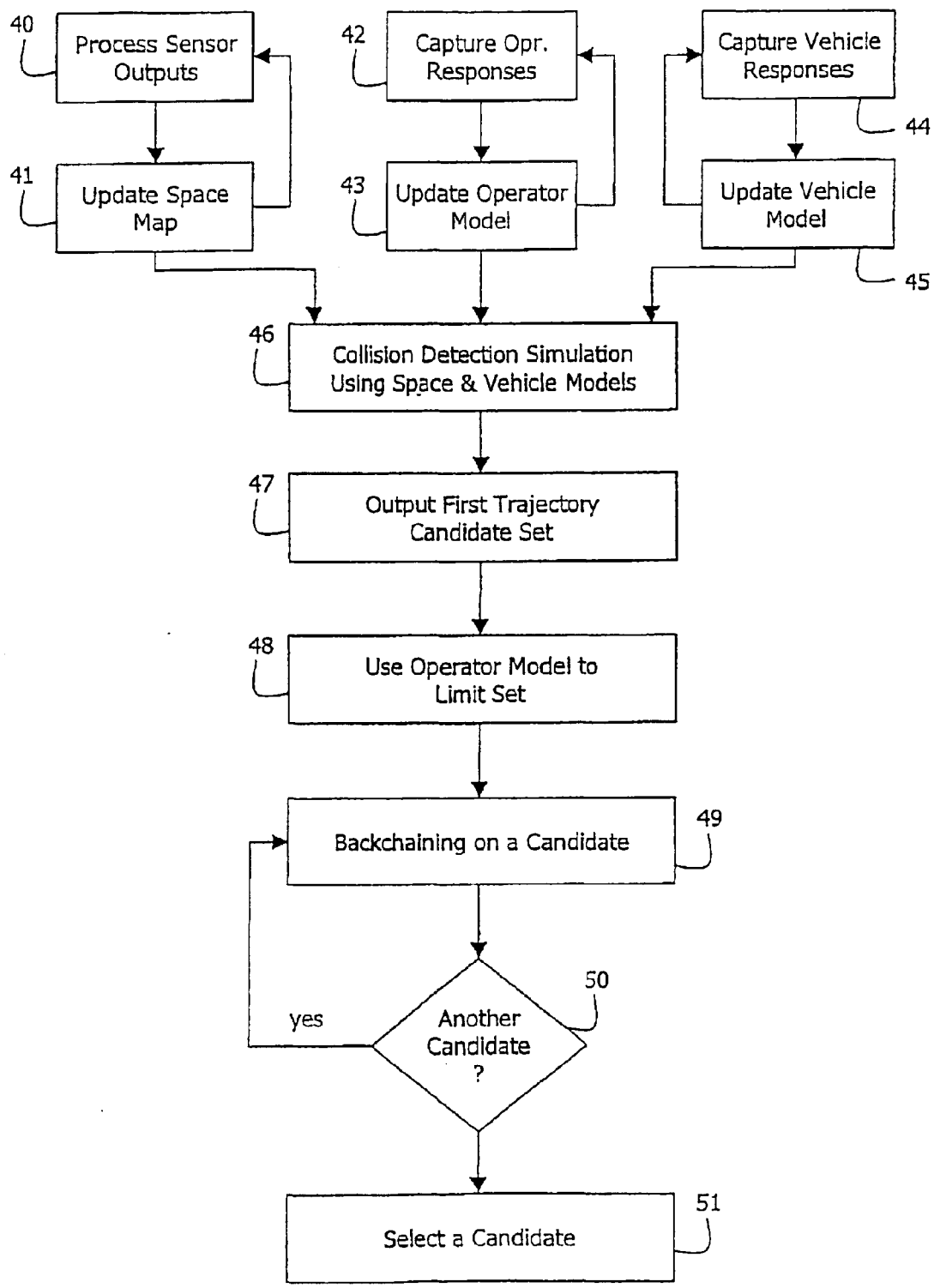
FIG. 4 is a flow diagram illustrating how the system determines a path to achieve a goal.
Figure 6A:
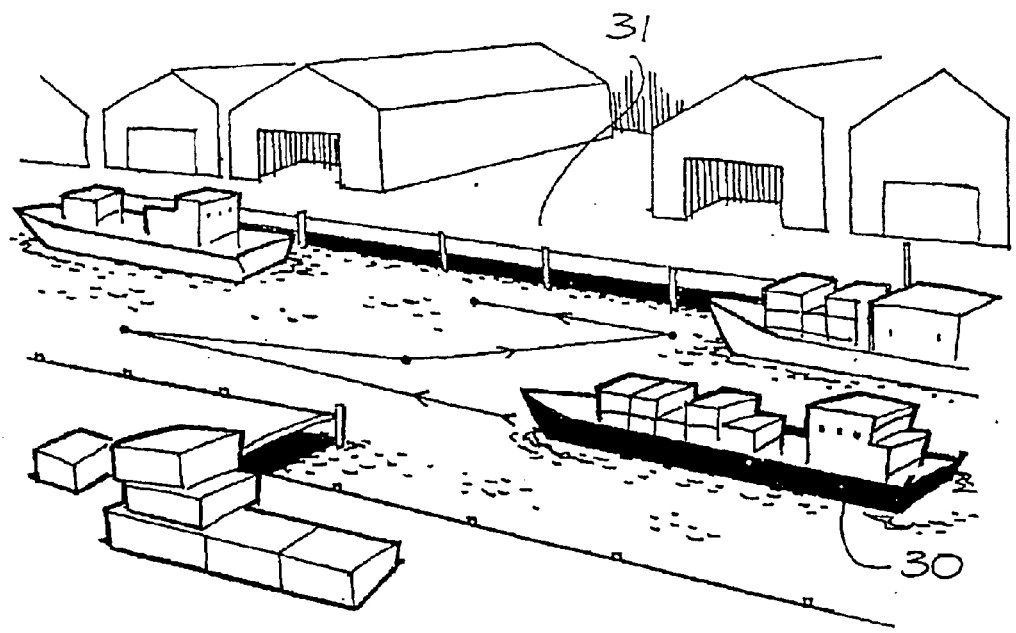
FIGS. 6(a) to 6(f) are a set of illustrations corresponding to FIGS. 3(a) to 3(f)
Figure 6B:
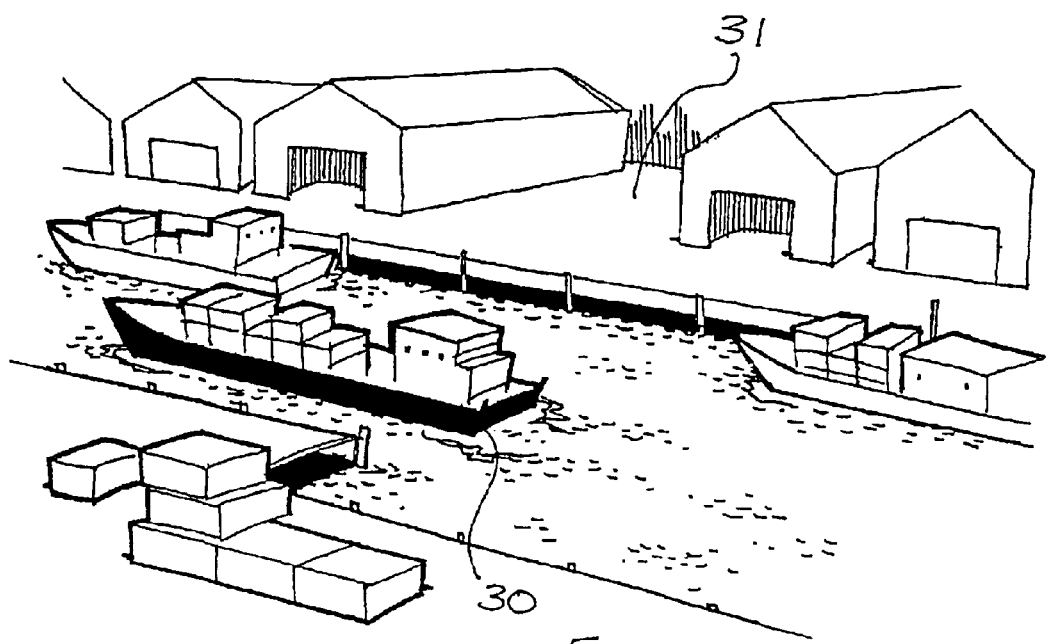
Figure 6C:
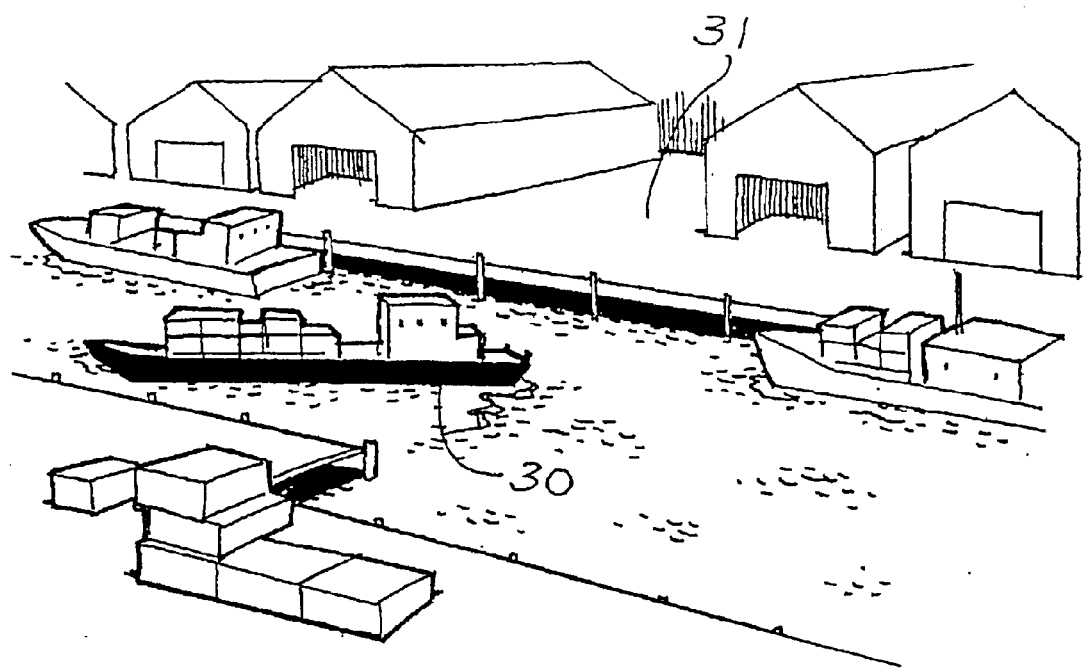
Figure 6D:
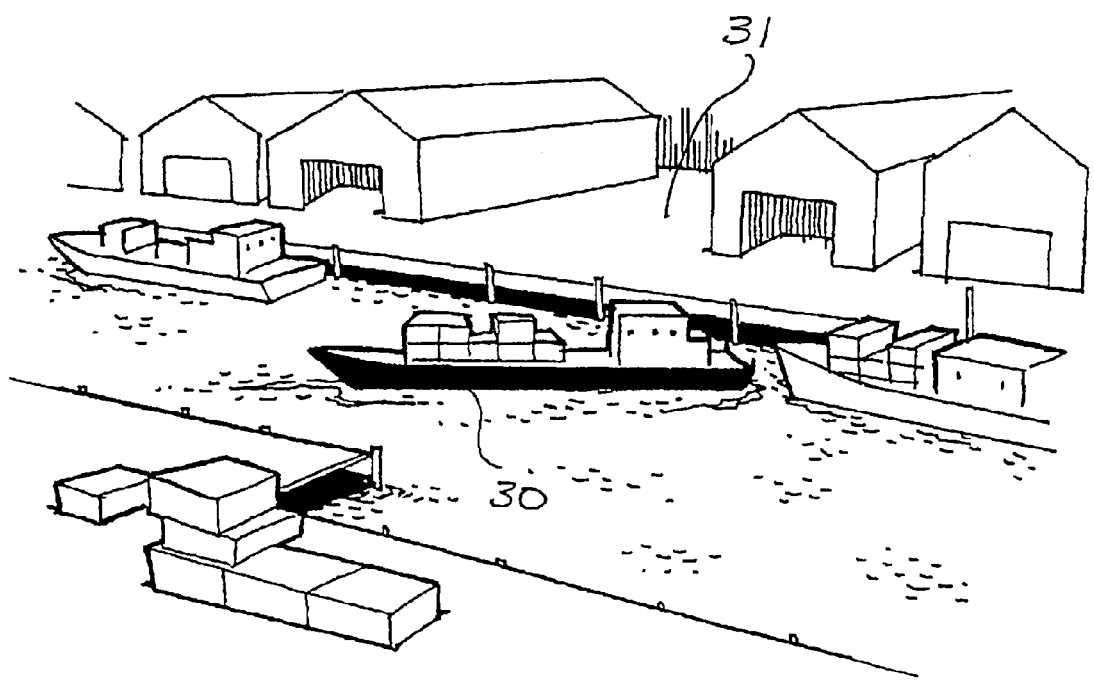
Figure 6E:
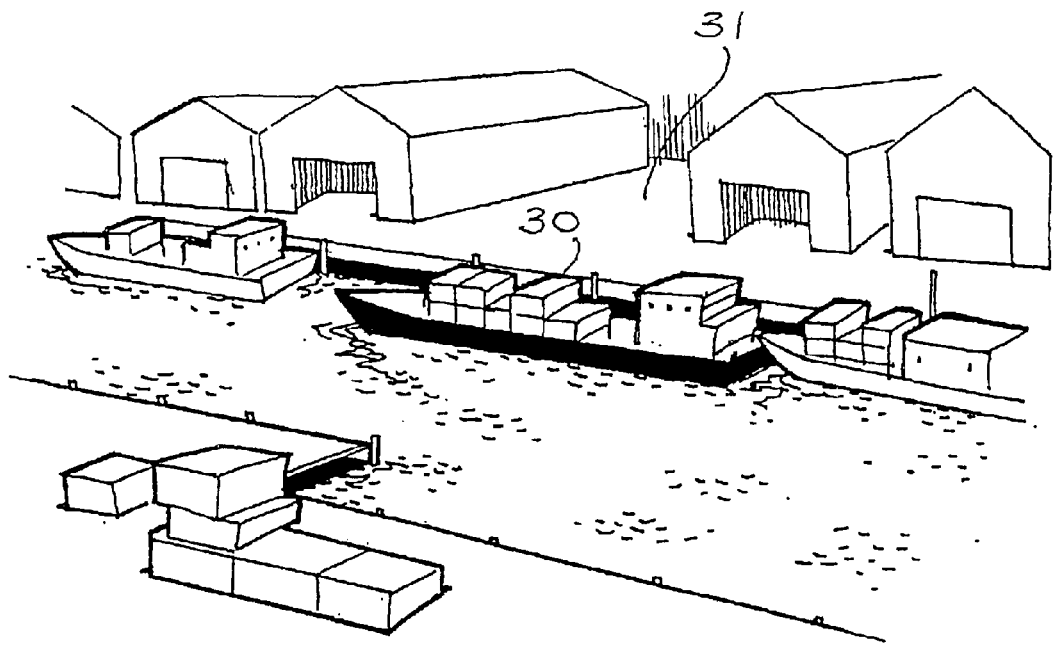
Figure 6F:
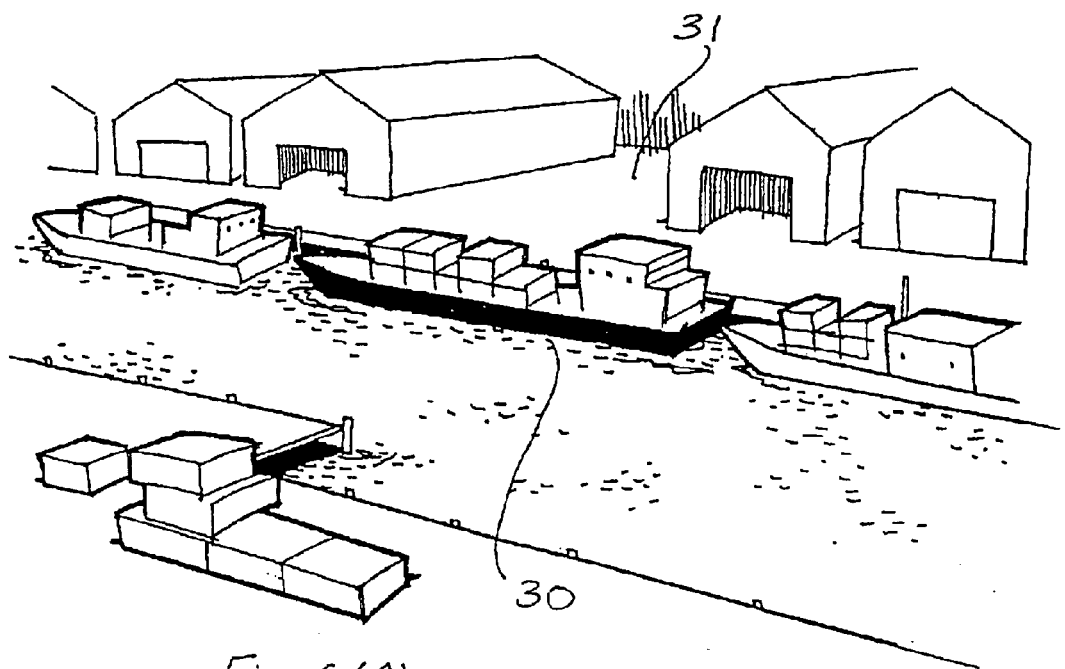

The system 1 plans a path to the goal in step 24, illustrated in more detail in FIG. 4. The path comprises a series of sub-goals which are reached by the operator manoeuvring the boat with the assistance of prompts automatically generated by the system 1. The sub-goal movements may be forward, reverse, rotational, or curved moves. An important aspect of the system 1 is that the path is planned on the basis of:

the dynamic space map 12 as well as the stored map 8, taking account of transient obstacles and conditions generally in real time, breaking down the path into-sub-goal manoeuvres determined according to the capabilities of the human operator as well as those of the boat; and breaking down the path into sub-goal manoeuvres determined according to what is instructable to the operator at any one point in time.

Figure 3A:
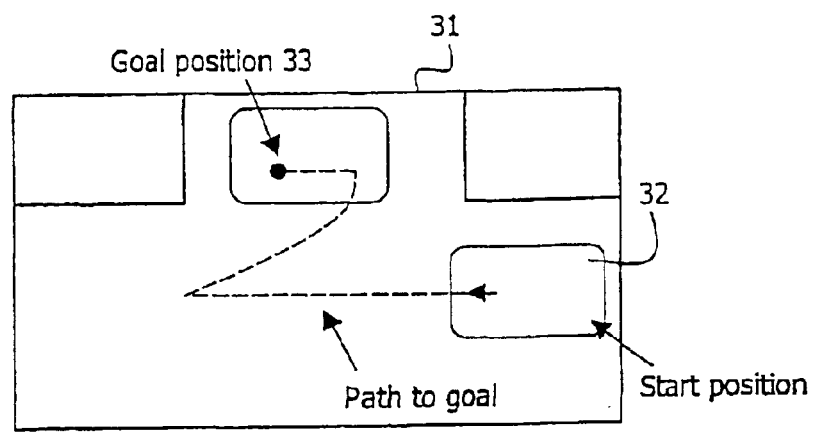
FIGS. 3(a) to 3(f) are diagrams illustrating movement of the boat.
Figure 3B:
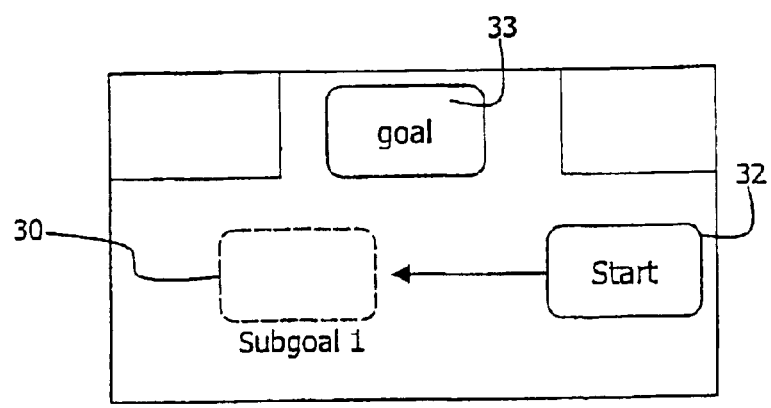
Figure 3C:
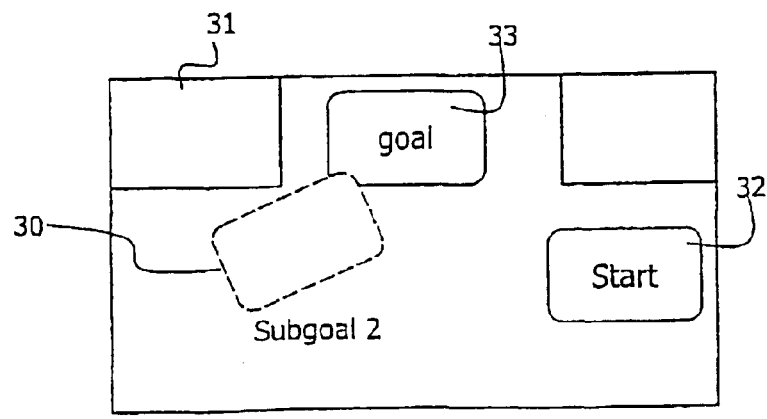
Figure 3D:
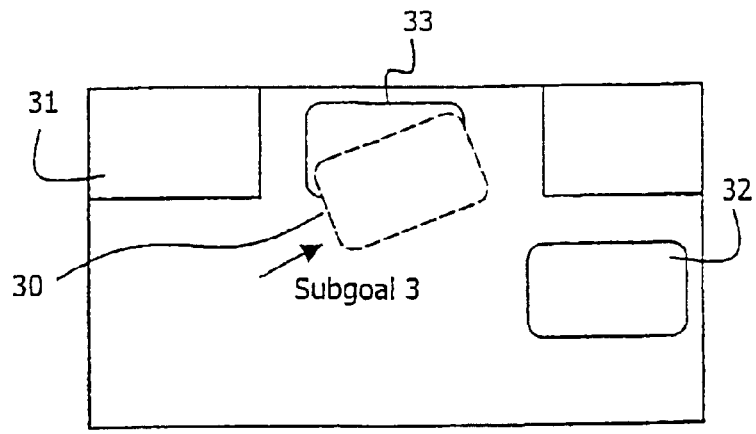
Figure 3E:
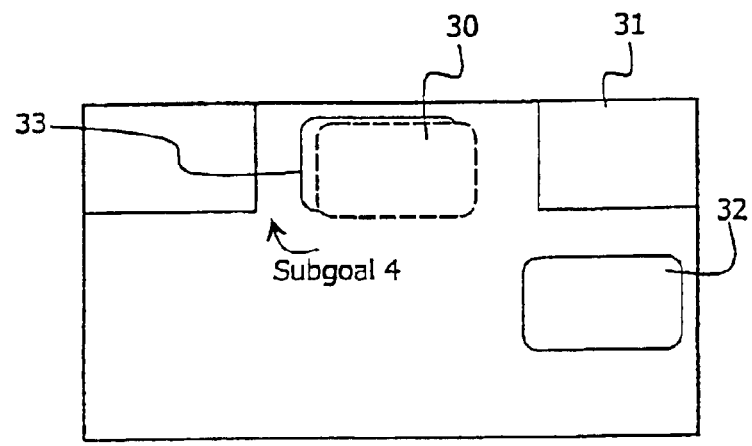
Figure 3F:
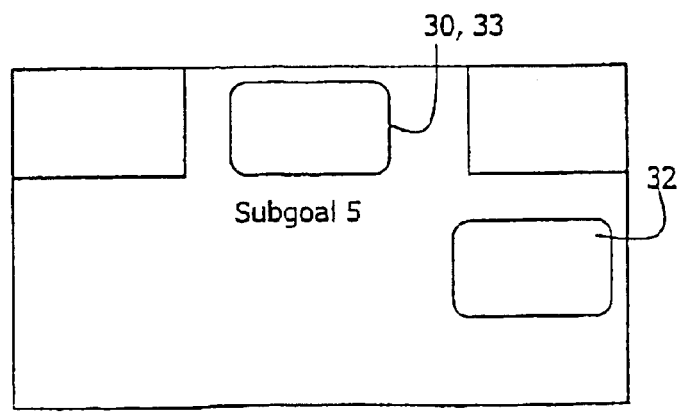

A path is illustrated diagrammatically in FIGS. 3(a) to 3(f) and in perspective in corresponding FIGS. 6(a) to 6(f). In this diagram the boat is indicated by the numeral 30 and the target dock by 31. The boat 30 is to move from a start position 32 to a goal position 33 in the dock 31. The start and goal positions 32 and 33 are shown in FIG. 3(a). A Sub-goal 1 (FIG. 3(b)) is a straight-ahead movement. A Sub-goal 2 (FIG. 3(c)) involves another straight-ahead movement. A Sub-goal 4 (FIG. 3(e)) involves a rotational movement, and a Sub-goal 5 (FIG. 3(f)) involves a final linear (translational) movement into position in the dock 31 at the goal position 33.

It will be appreciated that each of the movements is relatively simple and may be achieved by the operator under system instructions.

Execution of the planned path as described above is initiated by outputting an instruction in step 25, and in step 26 the system determines if the sub-goal has been reached. If the operator has not taken the required action to head toward the sub-goal another instruction is outputted. Upon reaching the sub-goal the system outputs an instruction for the next sub-goal as indicated by the decision step 27, until the goal is reached.

At any time the system issues a warning using the warning devices 18 if movement is deemed to be unsafe, such as likelihood of collision. This is detected by the sensors 3–7. These steps are steps 29(a) and 29(b) of FIG. 2.

Referring now to FIG. 4 the step 24 of planning the path is shown in more detail. During path planning and at all other times the system:

processes sensor outputs (40) and updates (41) the space map 12, captures (42) operator responses and updates (43) an operator model, and captures (44) vehicle responses and updates (45) a vehicle map.

As stated above the space map 12 is updated in real time, whereas updating of the vehicle and operator maps is near real-time.

Space Map

The space map comprises a set of polygons defining spatial areas in plan. Steps 40 and 41 comprise dynamically using the sensor outputs in real time to monitor occupancy of volumes an a 3D basis and breaking the 3D data down to a 2D plan of polygons. These polygons are dynamically flagged as being either occupied or unoccupied. The space map 12 also generates a list of all occupied polygons. This information is used to both plan the path and to avoid collisions during execution.

Operator Model

The operator model is defined using concepts set out in the paper "The Psychology of Human—Computer Interaction" by Card, Newell and Moran published by Lawrence Enbaum Associates in 1983. The parameters are time and distance. The time parameters are expressed in ms, and are:

time for the operator to perceive information, time for the operator to cognitively process information to perform an action, and time for the operator to implement the action, based on neuromuscular delay.

The distance parameter is a spatial error in performing the action. This takes account of the fact that there is considerably more human error in spatial movement terms than for robots. The distance parameter may be in translational or rotational terms.

Vehicle Model

The vehicle model is defined using concepts from the physics of motion. Important model parameters are how steering angles from the helm affect movement of the boat, boat displacement at different engine output power levels, the present water line at the dock 31, and wind and tide directions.

Path Planning

The path planning approach is inspired by the notion of pre-image back chaining as described in "Automatic synthesis of fine-motion strategies for robots" by T Cozano-Perez and M. A. Wesley, published in the International Journal of Robotic Research, 3(1): 3-24, 1984. To make the benefits of automatic path planning available to a human operator the approach has been expanded significantly to allow for the limitations of the human operator and dynamic properties of the space map and vehicle dynamics.

Referring again to FIG. 4, as well as the background steps 40–45, the system performs steps 46 to 51 to plan a path (overall step 24).

In step 46 the system simulates movement of the boat to the goal position in a number of different trajectories. For each trajectory, the system determines if there would be a collision. The system uses the space and vehicle models to determine if collisions will occur when "pushing" the boat through to the goal position 33. The result of step 46 is that a first set of candidate trajectories is outputted in step 47.

The system then in step 48 uses the operator model 11 to limit the first candidate set to those which the operator is likely to be able to achieve, i.e. which are instructable.

In step 49 the system 1 performs backchaining to break down each candidate trajectory of the second set in turn. This involves:

(a) starting at the goal position 33, (b) moving back to a position from which the boat can reach the goal position 33 in an instructable movement, and (c) repeating (a) and (b) for each successive sub-goal backwards to the current position.

Backchaining is performed for each candidate trajectory of the second set, as indicated by the decision step 50. In step 51 the system selects one of these trajectories as the planned path.

Figure 7:
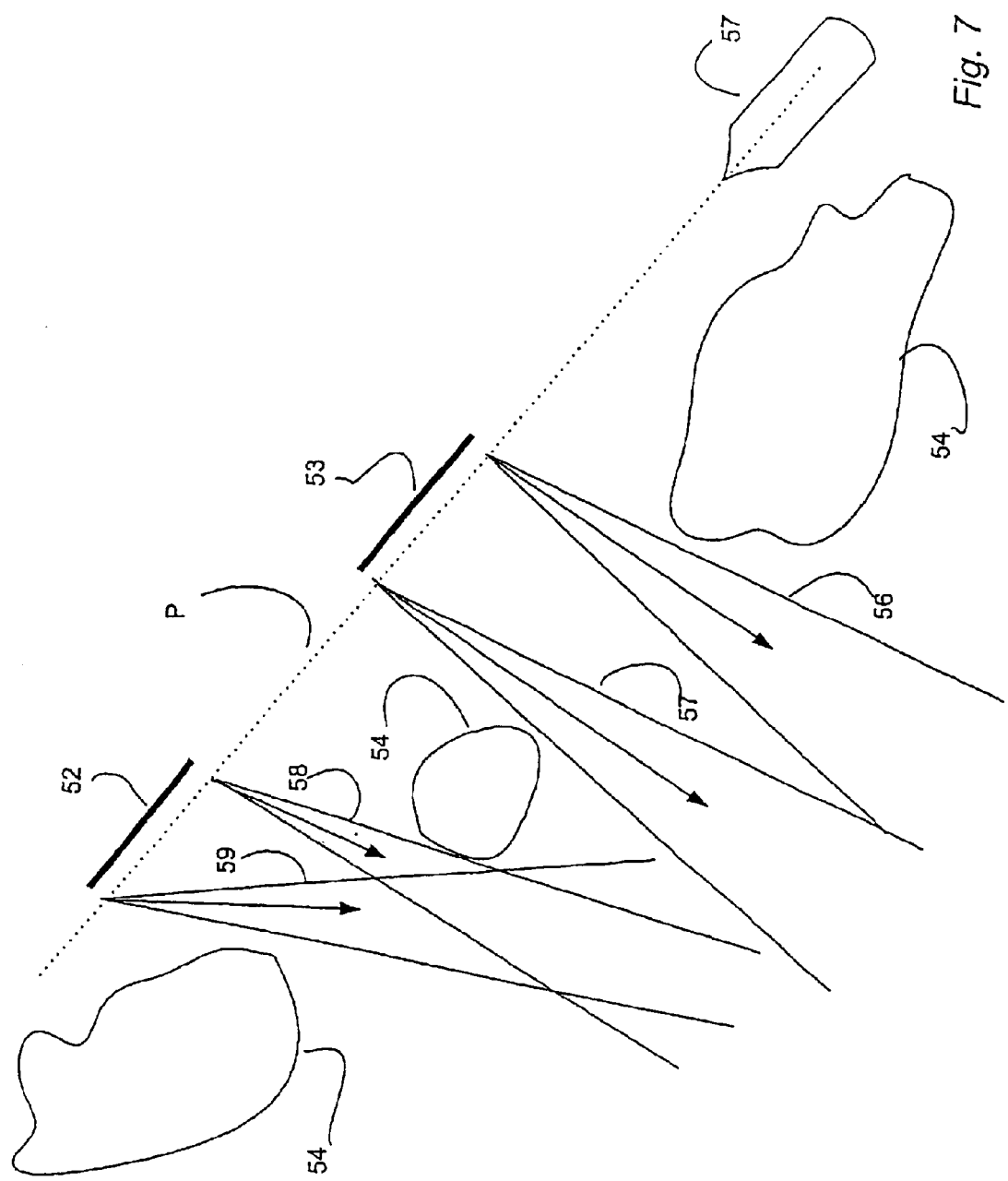
FIG. 7 is a diagram illustrating alternative path planning for a boat.

FIG. 7 shows an example of a boat 57, moving along a trajectory (path) P. If the goal is to move the boat to the other side of sand banks 54 then two regions 52, 53 can be identified on the current trajectory from which this goal is achievable. The beginning and end of the sub-goal regions 52, 53 are identified by the regions 56, 57, 58, and 59. These regions indicate the range of headings that the human operator is most likely to achieve if instructed to turn in the direction of the arrows. The range of headings used in the path planning depends on both the manoeuvrability of the boat and the skill of the human operator. The system will choose between the sub-goals 52 and 53 on the basis of safety, total distance to the goal, speed to reach the goal, and minimising the number of sub-goals to reach the goal.

Thus, the output of the path planning step is a set of sub-goals, each reachable in a single boat manoeuvre and being individually instructable to the operator (pilot). The latter aspect is particularly important as it ensures that the operator (pilot) is at all times in control and manoeuvring of the boat is not autonomous. Furthermore, the path planning steps is dynamically repeated on an interactive basis as the boat moves. This is to take account of changes in conditions reflected in the space map in real time.

It will be appreciated that the system 1 allows a vehicle to move in attainable movements tailored to the abilities of the operator and of the vehicle. Also, the system does not rely exclusively on pre-set maps or GPS location data, and instead uses sensor outputs in real time to dynamically maintain a more meaningful space map of vehicle location data and of possible obstructions. This takes account of unexpected movement of third parties or objects and ensures that at all times effective and safe movement is possible. Another important advantage is that the operator is responsible for movement, the system providing comprehensive assistance but not taking over control.

Figure 8:
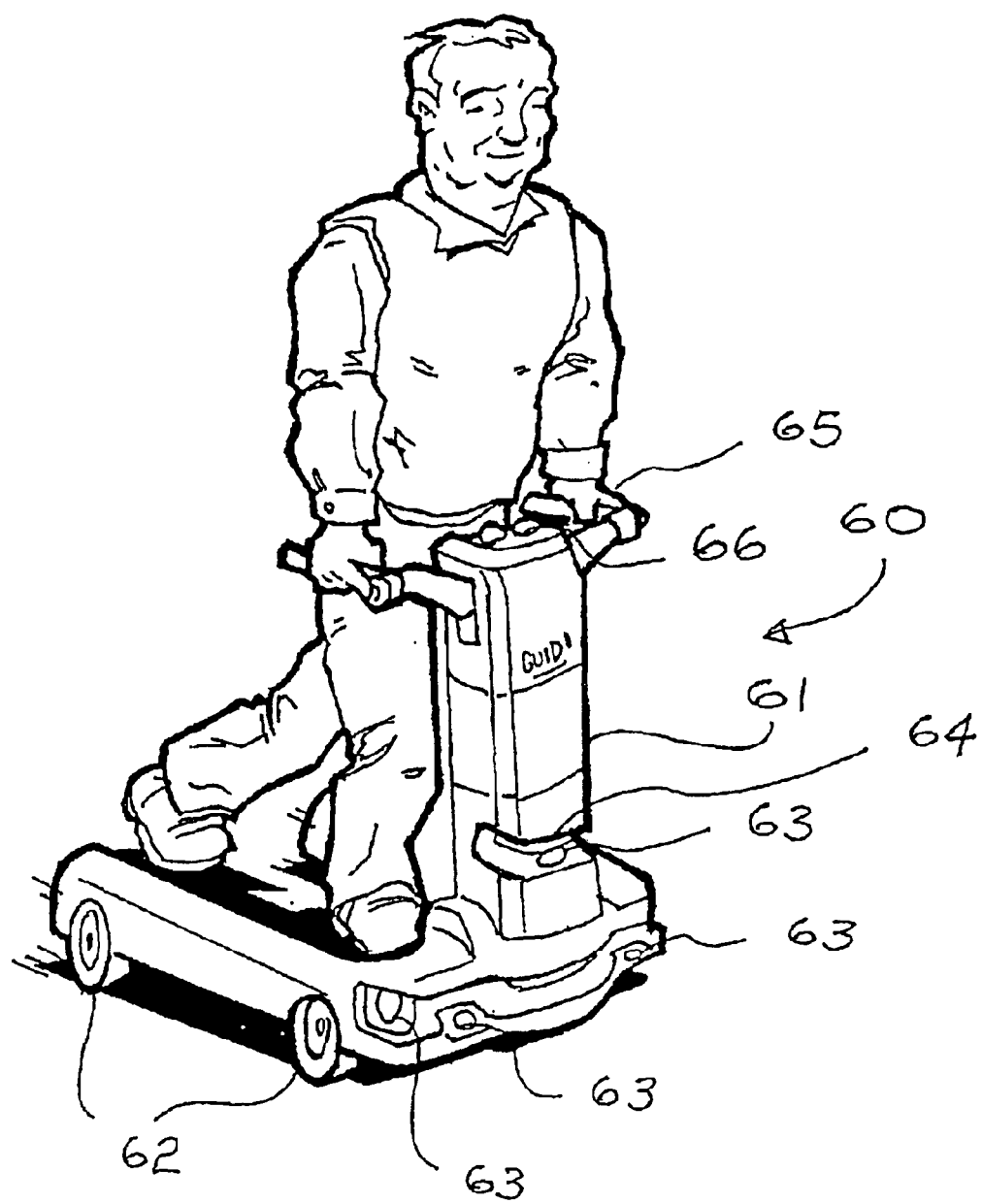
FIG. 8 is a perspective view of a walking frame incorporating a guidance system.

The invention is not limited to the embodiments described but may be varied in construction and detail. For example, the invention may be applied to other vehicles such as cars, lorries, wheelchairs, walking frames, or submersibles. The sensors would be chosen to suit the particular environment of the vehicle. Another embodiment is a guidance system for a visually impaired person using a rollator 60 having a frame 61 and wheels 62 as shown in FIG. 8. The system 60 provides a user with the ability of manoeuvring their walling aid in confined spaces without the fear of colliding with people or objects around them. In this embodiment, the orientation system comprises sonar devices 63, a laser range finder 64, a haptic feedback steering handlebar 65, and a speech synthesiser 66. This guidance system operates on the same principles as the boat guidance system described above.

What is claimed is:

1. A vehicle guidance system (1) comprising means for detecting position of a vehicle (30) and a processor (2) for generating operator instructions to assist the operator to manoeuvre the vehicle, characterised in that the system comprises range sensors (3–7) and means for using outputs of the sensors to dynamically maintain a space map (12) in real time;

the system comprises an operator model of operator capabilities; and the processor (2) comprises means for planning a path to a goal position (33) in a confined space using data from the operator model (11) of operator capabilities and data from the space map (12).

2. A vehicle guidance system as claimed in claim 1, wherein the system comprises means for maintaining the space map (12) as a set of polygons each defining a spatial area.

3. A vehicle guidance system as claimed in claim 2, wherein said space map (12) maintaining means comprises means for processing three-dimensional space data from the sensors and for breaking said data to two-dimensional space data in a polygon framework.

4. A vehicle guidance system as claimed in claim 2, wherein said space map maintaining means comprises means for maintaining a flag for each polygon, said flag indicating if the polygon is occupied by an object.

5. A vehicle guidance system as claimed in claim 1, wherein the operator model (11) comprises time parameter values for the operator to perceive information, for the operator to cognitively process information, and for neuro-muscular delay for implementing an action.

6. A vehicle guidance system as claimed in claim 5, wherein the operator model (11) comprises a parameter value for spatial error for performing an action.

7. A vehicle guidance system as claimed in claim 1, wherein the processor comprises means for storing a vehicle model (10) of movement characteristics of the vehicle (30).

8. A vehicle guidance system as claimed in claim 1, wherein the processor (2) comprises path planning means for planning (24) a plurality of sub-goals forming a path to the goal position (33).

9. A vehicle guidance system as claimed in claim 8, wherein the path planning means comprises means for determining a sub-goal only if it can be achieved with a single manoeuvre of the vehicle (30) and if it is instructable to the operator.

10. A vehicle guidance system as claimed in claim 8, wherein the path planning means comprises means for determining (47) a set of candidate trajectories for reaching the goal position (33) with collision avoidance, and for performing backchaining to break each candidate trajectory into a plurality of sub-goals starting from the goal position (33) and extending back to the current position (32).

11. A vehicle guidance system as claimed in claim 10, wherein the set of candidate trajectories is determined by generating (47) a first set of candidate trajectories compatible with the space and the vehicle models (10, 12), and for subsequently reducing (48) the first set to those compatible with the operator model (11).

12. A vehicle guidance system as claimed in claim 10, wherein the path planning means comprises means for dynamically repeating path planning (24) in real time at each of a plurality of vehicle positions.

13. A vehicle guidance system as claimed in claim 1, wherein the vehicle model (10) is for a boat, and the sensors comprise a sonar device (3), a laser range finder (4), a vision system (5), a radar system (6), and a GPS circuit (7).

14. A vehicle comprising a guidance system as claimed in claim 1.

15. A method of guiding a vehicle from a current position (32) to a goal position (33) in a confined space, the method comprising the steps of:

range sensors (3–7) automatically sensing objects around the vehicle (30), a processor using outputs of the range sensors to dynamically maintain a space map (12) in real time, the processor planning a path to the goal position (33) using data from the space map (12) and from an operator model of operator capabilities, an output interface (16–19) outputting instructions to the operator for movement of the vehicle according to the planned path, and the operator moving the vehicle according to the instructions.

16. A method as claimed in claim 15, wherein the processor generates instructions for the operator for movement of the vehicle in a single manoeuvre at a time.

17. A method as claimed in claim 15, wherein the processor performs backchaining to break down a path into a plurality of sub-goals, and generates an operator instruction to achieve each sub-goal in turn.

18. A method as claimed in claim 17, wherein the processor repeats path planning at each position on the basis of the current position.

19. A method as claimed in any of claim 15, wherein the processor generates the operator instructions also using data from a vehicle model of vehicle movement characteristics.

* * * * *